United States Patent [19]
Derby

[11] Patent Number: 4,495,392
[45] Date of Patent: Jan. 22, 1985

[54] MICROWAVE SIMMER POT

[75] Inventor: Palmer P. Derby, Weston, Mass.

[73] Assignee: Raytheon Company, Lexington, Mass.

[21] Appl. No.: 337,785

[22] Filed: Jan. 7, 1982

Related U.S. Application Data

[63] Continuation of Ser. No. 138,070, Apr. 7, 1980, abandoned, which is a continuation of Ser. No. 937,671, Aug. 18, 1978, abandoned.

[51] Int. Cl.³ ............................................. H05B 6/80
[52] U.S. Cl. ...................... 219/10.55 E; 219/10.55 F; 99/451; 99/DIG. 14; 426/243
[58] Field of Search ............... 219/10.55 E, 10.55 M, 219/10.55 R, 10.55 F; 426/241, 243, 107, 234; 99/451, DIG. 14; 220/423, 424; 126/390, 375, 246

[56] References Cited

U.S. PATENT DOCUMENTS

| | | | |
|---|---|---|---|
| 2,024,454 | 12/1935 | Justheim | 126/390 X |
| 3,295,709 | 1/1967 | Herrick et al. | 220/424 X |
| 3,783,220 | 1/1974 | Tanizaki | 219/10.55 E |
| 3,941,967 | 3/1976 | Sumi et al. | 219/10.55 E |
| 3,965,323 | 6/1976 | Forker, Jr. et al. | 219/10.55 E |
| 3,974,354 | 8/1976 | Long | 219/10.55 E |
| 3,985,990 | 10/1976 | Levinson | 219/10.55 E |
| 3,985,991 | 10/1976 | Levinson | 219/10.55 E |
| 4,093,841 | 6/1978 | Dills | 219/10.55 E |
| 4,140,887 | 2/1979 | Sutton et al. | 219/10.55 E |

*Primary Examiner*—B. A. Reynolds
*Assistant Examiner*—Philip H. Leung
*Attorney, Agent, or Firm*—William R. Clark; Joseph D. Pannone; Herbert W. Arnold

[57] ABSTRACT

A microwave cooking system comprising a thermally insulated holder for food bodies having a thermally reflective shield for reflecting thermal radiation from the food bodies to thereby reduce the loss of heat by radiation through the thermal insulation layer while providing for propagation of microwave energy into the food body through the thermal insulating portion of the food holder.

1 Claim, 4 Drawing Figures

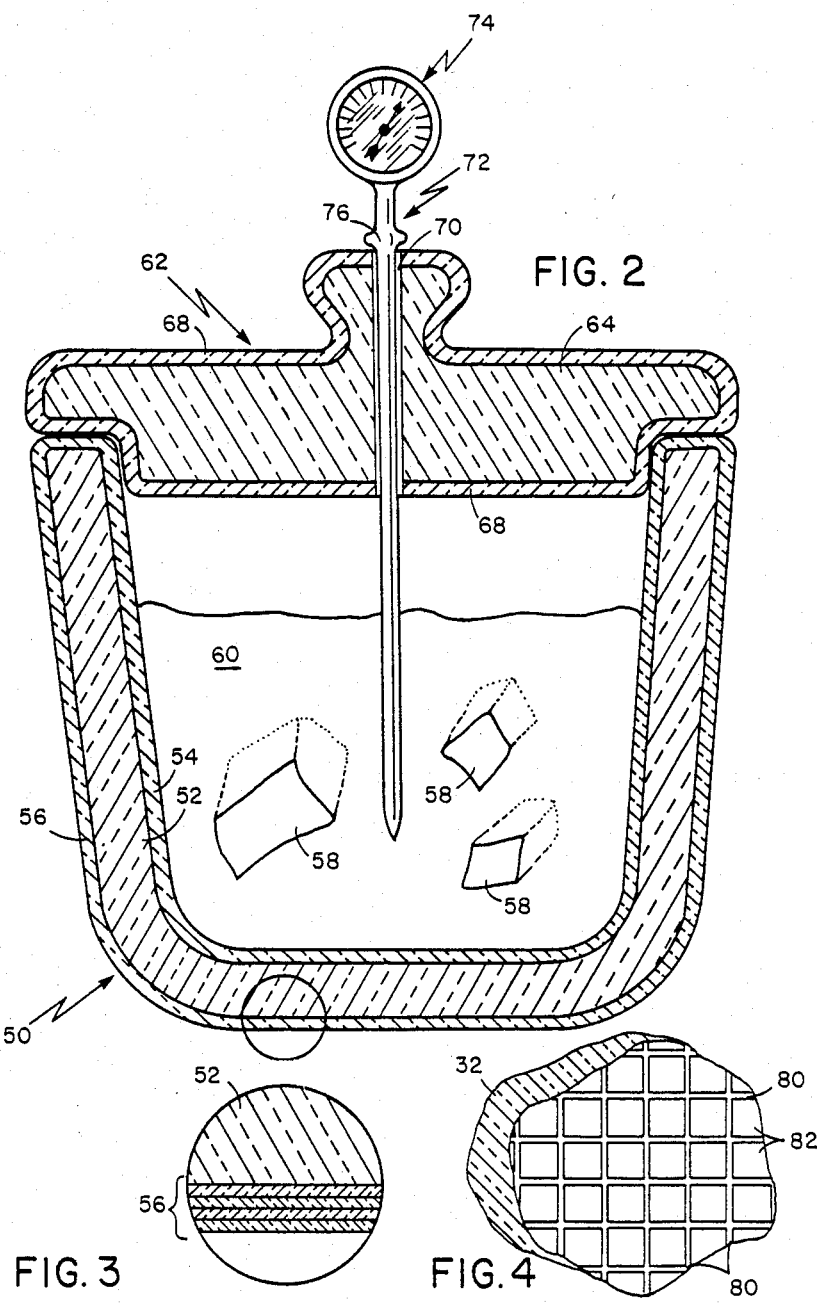

MICROWAVE SIMMER POT

CROSS-REFERENCE TO RELATED CASES

This is a continuation of application Ser. No. 138,070 filed Apr. 7, 1980, which is a continuation of application Ser. No. 937,671, filed Aug. 28, 1978, now both abandoned.

BACKGROUND OF THE INVENTION

Thermally insulating food holders such as crock pots have been used in microwave ovens to keep food once cooked warm and to provide for simmering. However, such dishes do not thermally insulate foods well due to radiation of thermal energy from the food body both into and through the walls of the crock pot. This results in having to supply excess microwave energy to the crock pot. Also, the energy used for heating the crock pot may be regarded as wasted energy since it does not contribute to actually cooking the food.

SUMMARY OF THE INVENTION

In accordance with this invention a thermally insulated food holder is provided having means for reflecting thermal energy radiated from the food body.

Further in accordance with this invention the holder may be a crock pot made of material that absorbs low amounts of microwave energy so that the microwave energy is used principally for heating the food body. More specifically, a container is provided having thick walls of low microwave loss material such as alundum or products sold under the trademark Corningware at least portions of the inside and/or outside of the container are coated with a layer which reflects radiated infrared energy so that thermal energy radiated from the food body is reflected back into the food body either from the inner wall or the outer wall and microwave energy impinging on the crock pot propagates into the interior of the crock pot. Further in accordance with this invention a cover is provided with infrared reflective coatings arranged for propagating microwave energy into the pot through the cover.

Further in accordance with this invention a temperature sensing device may constitute a metal probe of highly conductive material containing a thermal sensing element which extends through an aperture in the cover and acts as a radiator conducting microwave energy from the oven into the interior of the container.

BRIEF DESCRIPTION OF THE DRAWINGS

Other and further objects and advantages of the invention will be apparent as the description thereof progresses, reference being added to the accompanying drawings wherein:

FIG. 2 illustrates a transverse sectional view of the embodiment of FIG. 1 taken along line 2—2 of FIG. 1; and FIGS. 3 and 4 illustrate expanded detail views of alternate embodiments of the invention.

DESCRIPTION OF THE PREFERRED EMBODIMENT

Figure 1:
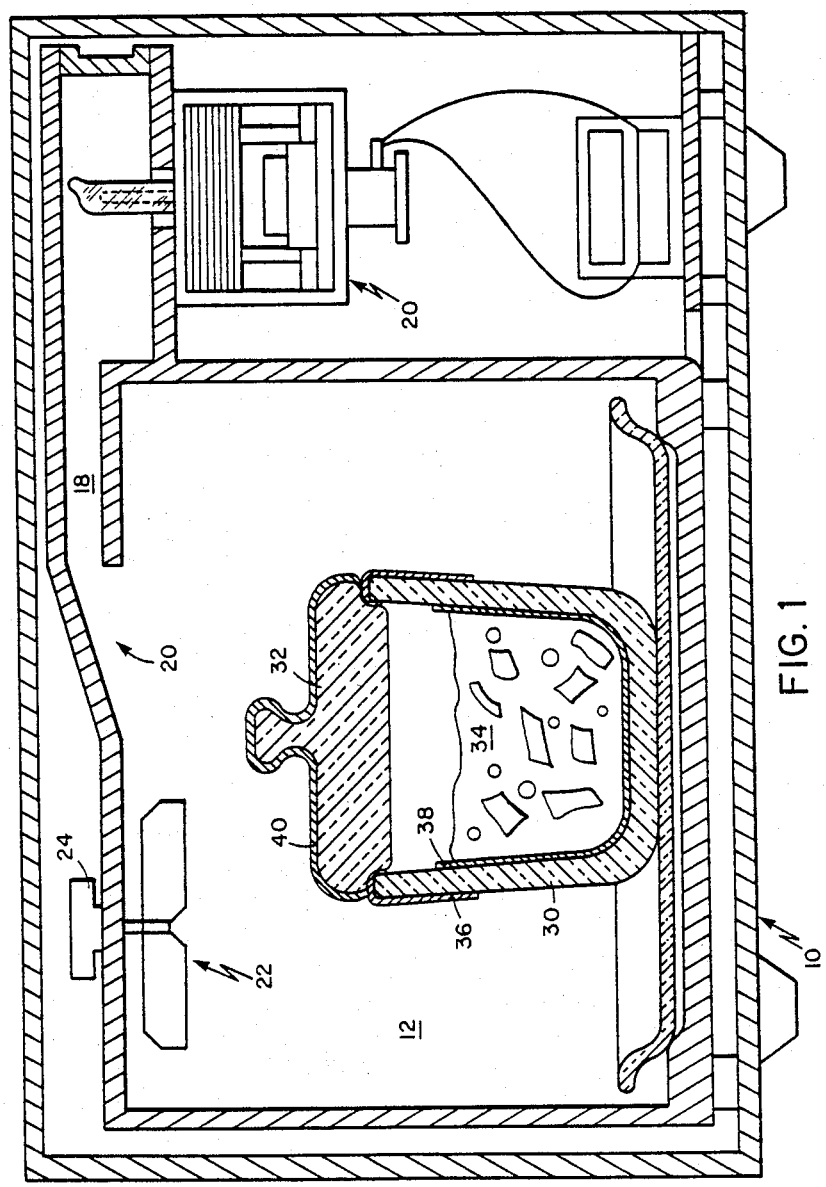
FIG. 1 illustrates a longitudinal sectional view of a container in a microwave oven illustrating an embodiment of the invention.

Referring now to FIG. 1 there is shown a microwave oven 10 comprising an enclosure 12 closed by a door (not shown). Enclosure 12 is supplied with microwave energy from a waveguide feed 18 supplied by a magnetron 20 in accordance with well-known practice at a frequency of for example 2.45 KMH. The energy is radiated into enclosure 12 through an aperture 20 and is stirred to form a plurality of modes by a mode stirrer 22 driven by a motor 24. Any desired microwave oven may be used; and frequencies such as 915 megahertz or other frequencies may be used to excite enclosure 12.

In accordance with this invention there is provided in oven 10 a container 30 having a cover 32. Both container and cover 32 may be made for example of any low thermal conductivity material such as porous ceramic or materials such as Corningware and preferably have total wall thicknesses of several centimeters to prevent thermal energy in a food body 34 contained in container 30 from dissipating by conduction through the container. As illustrated herein, the container 30 rests, for example on a glass tray, in the bottom of oven 10.

The upper half of the outer surface of container 30 is coated with a metallic thermally reflective coating 36 such as aluminum or stainless steel. The bottom and lower two thirds of the inner surface of container 30 is also coated with a metal coating 38 of thermally reflective material, similar to coating 36. As it is apparent from FIG. 1, the microwave and thermal radiation reflective coatings 36 and 38 are partially overlapping. Since the coating 38 is a high reflector of thermal radiation even though it is at the temperature of food body 34 which may be over 100° F. it is a poor thermal radiator and hence relatively low amounts of thermal energy are radiated through container 30. Portions of thermal energy which are radiated out of container 30 from the food body in the region between the bottom edge of cover 32 and the upper edge of reflective coating 38 impinge on outer coating 36 and hence are predominantly reflected back into the region of food body 34.

The outer surface of cover 32 also is substantially covered with a reflective coating 40. Microwave energy, however, radiated into oven 10 passes along container wall 30 between coating 36 and 38 and is reflected from coating 40 downwardly into the region of food body 34 to heat the food body directly.

DESCRIPTION OF AN ALTERNATE EMBODIMENT

Referring now to FIG. 2 there is shown an alternate embodiment of the invention consisting of a container 50 having a wall 52 having a thickness of for example a few centimeters. Wall 52 is formed preferably of material which has low thermal conductivity and low absorption to microwave energy such as for example porous alundum or pyro ceramic.

The inner and outer surfaces of walls 50 support layers 54 and 56 of material which is substantially transparent to microwave energy but is substantially reflective to thermal or infrared energy in the frequency range radiated from a food body 58 positioned in the container 40 preferably in the presence of liquid 60. Thermal radiation energy from heated food bodies is in the deep infrared region and is a function of the temperature of the radiating body. Coatings 54 and 56 preferably present a high or a low impedance to radiated energy in this frequency range to reflect the energy by impedance mismatch. However, the coatings 54 and 56 preferably do not substantially inhibit the propagation of microwave energy through the wall 52 of the container 50 from passing into the liquid 60 and hence into the food body 58.

As shown in FIG. 3, for example, layer 56 is four layers of alternately different indexes of refraction at infrared frequencies such as barium titanate and silicon dioxide which are preferably an odd number of quarter wave lengths thick at an infrared frequency of 100 microns.

Another means for producing coatings for the container 50 and cover 62 of FIG. 2 as shown in FIG. 4 wherein a fragment of wall 52 of the container 50 is shown greatly expanded. Small reflective metal region 82 are deposited by painting, silk screening, evaporation, or any other desired means on the surface 80 of wall 52. As illustrated herein, regions 82 have maximum dimensions very much less than a quarter wavelength of the microwave frequency and are separated by narrow regions of surface 80 of the wall which acts as insulating spaces between the regions 80. Such a coating will pass large amounts of microwave energy through the wall 52 of the container 50. However, the regions 80 are many wavelengths across over the band of frequencies of the infrared radiation of thermal energy from the food body 58 and/or liquid 60 which causes the regions 82 to act as thermal radiation reflectors. Regions 82 are preferably used as both coatings 54 and 56 to optimize thermal radiation energy reflection. Materials which may be used for regions 82 are thin layers of reflecting metals such as aluminum, silver, gold, copper, or stainless steel.

Multiple layers of regions 82 separated by regions of insulators may also be used, such as for example aluminum flakes, whose surfaces have layers of alundum, may be applied in an insulating binder provided the coating is thin enough so that only a few flakes overlap at any point.

While the dielectric constant of the wall material 52 at microwave frequencies may be of any desired value, it preferably is selected to assist in coupling energy from a microwave oven in which the container 50 is to be placed through the walls 52 into the liquid 60. For example, if the liquid 60 is predominantly water having a dielectric constant of about 80 at the microwave frequency of 2.45 KMH a dielectric constant for the material for the walls 42 of 5 to 10 will assist in impedance matching from the relatively high impedance of the liquid.

A cover 62 for container 50 is preferably made of material similar to that of wall 52 and preferably has a wall 64 several centimeters thick. Coatings 66 and 68 on the inner and outer surfaces of cover 62 or supported on wall member 64 are preferably forming in the manner and operated as coatings 44 and 46.

If desired, an aperture 70 may be provided in the cover through which a thermal sensing probe 72 is connected to an indicator 74 in a plastic case containing a pointer actuated by a thermal sensing rod (not shown) inside a tubular metal member 76 which extends through aperture 70 into the liquid 60. Indicator 74 is preferably of a conventional type for use in microwave ovens. The metal member 76 extending through the cover 52 preferably is of high conductivity metal and acts as a radiating conductor for aiding the coupling microwave energy through the cover 52 into the liquid 50.

This completes the description of the embodiments of the invention illustrated herein. However, many modifications thereof will be apparent from the foregoing disclosure without departing from the spirit and scope of the invention. For example, food holders other than crock pots, such as frying pans or roasters could be formed in accordance with the principles of this invention. Accordingly, it is intended that this invention be not limited to the particular details of the embodiments disclosed herein except as defined by the appended claims.

What is claimed is:

1. A cooking utensil for heating food with microwave energy, comprising:

a microwave transparent container for holding food, said container having thick, low thermal conductivity walls;

a first microwave and thermal radiation reflective layer covering a portion of the outer surface of said container;

a second microwave and thermal radiation reflective layer covering a portion of the inner surface of said container, said first and second layers partially overlapping;

a lid removably positioned over said container, said lid having low thermal conductivity; and said first and second layers being spaced by the thickness of said walls of said container to provide a path through said microwave transparent walls in the region of said overlap for microwave energy to enter the interior of said container to heat said food.

* * * * *